US010657055B1

(12) United States Patent
Jalal et al.

(10) Patent No.: US 10,657,055 B1
(45) Date of Patent: May 19, 2020

(54) APPARATUS AND METHOD FOR MANAGING SNOOP OPERATIONS

(71) Applicant: Arm Limited, Cambridge (GB)

(72) Inventors: Jamshed Jalal, Austin, TX (US); Mark David Werkheiser, Austin, TX (US); Gurunath Ramagiri, Austin, TX (US); Mukesh Patel, Round Rock, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/218,962

(22) Filed: Dec. 13, 2018

(51) Int. Cl.
*G06F 12/08* (2016.01)
*G06F 12/0831* (2016.01)
(Continued)

(52) U.S. Cl.
CPC ...... *G06F 12/0835* (2013.01); *G06F 12/0804* (2013.01); *G06F 12/0822* (2013.01); *G06F 2212/621* (2013.01)

(58) Field of Classification Search
CPC .. G06F 12/0835; G06F 12/0822; G06F 12/08; G06F 12/0831; G06F 12/0815; G06F 12/0813; G06F 12/0833; G06F 13/382; G06F 13/4217; G06F 13/42; G06F 2212/621; G06F 2212/1044
(Continued)

(56) References Cited

U.S. PATENT DOCUMENTS 6,810,467 B1 * 10/2004 Khare ............... G06F 12/0822
711/140
7,325,102 B1 * 1/2008 Cypher ............. G06F 12/0831
711/146

(Continued)

*Primary Examiner* — Shawn X Gu
*Assistant Examiner* — Jean C Edouard
(74) *Attorney, Agent, or Firm* — Nixon & Vanderhye P.C.

(57) ABSTRACT

An apparatus and method are provided for managing snoop operations. The apparatus has an interface for receiving access requests from any of N master devices that have associated cache storage, each access request specifying a memory address within memory associated with the apparatus. Snoop filter storage is provided that has a plurality of snoop filter entries, where each snoop filter entry identifies a memory portion and snoop control information indicative of the master devices that have accessed that memory portion. When an access request received at the interface specifies a memory address that is within the memory portion associated with a snoop filter entry, snoop control circuitry uses the snoop control information in that snoop filter entry to determine which master devices to subject to a snoop operation. The snoop control circuitry maintains master indication data used to identify a first subset of the plurality of master devices whose accesses to the memory are to be precisely tracked within the snoop filter storage. The first subset comprises up to M master devices, where M is less than N. Each snoop filter entry has a precise tracking field and an imprecise tracking field. When multiple master devices have accessed the memory portion associated with a snoop filter entry, then the precise tracking field is used to precisely identify each master device of those multiple master devices that is within the first subset. When the multiple master devices includes at least one master device that is not in the first subset, then a generic indication is set in the imprecise tracking field.

18 Claims, 10 Drawing Sheets

(51) Int. Cl.
*G06F 12/0804* (2016.01)
*G06F 12/0817* (2016.01)

(58) Field of Classification Search
USPC .......................................................... 711/146
See application file for complete search history.

(56) References Cited

U.S. PATENT DOCUMENTS

| | | | | |
|---|---|---|---|---|
| 2004/0003184 A1* | 1/2004 | Safranek | ............... | G06F 12/082 |
| | | | | 711/146 |
| 2004/0186963 A1* | 9/2004 | Dieffenderfer | ...... | G06F 12/0831 |
| | | | | 711/146 |
| 2004/0186964 A1* | 9/2004 | Dieffenderfer | ...... | G06F 12/0831 |
| | | | | 711/146 |
| 2006/0224836 A1* | 10/2006 | Blumrich | ............ | G06F 12/0822 |
| | | | | 711/146 |
| 2007/0233965 A1* | 10/2007 | Cheng | ................. | G06F 12/0831 |
| | | | | 711/146 |
| 2008/0209133 A1* | 8/2008 | Ozer | ................... | G06F 12/0822 |
| | | | | 711/146 |
| 2009/0300289 A1* | 12/2009 | Kurts | ................. | G06F 12/0831 |
| | | | | 711/133 |
| 2014/0189254 A1* | 7/2014 | Pardo | ................. | G06F 12/0822 |
| | | | | 711/146 |
| 2015/0199290 A1* | 7/2015 | Mathewson | .......... | G06F 13/364 |
| | | | | 710/110 |
| 2015/0302193 A1* | 10/2015 | Sara | ................... | G06F 13/4221 |
| | | | | 726/23 |
| 2016/0062893 A1* | 3/2016 | Tune | .................. | G06F 12/0833 |
| | | | | 711/135 |

* cited by examiner

IMPRECISE TRACKING FIELD OPTIONS

OPTION A

350
SINGLE BIT FIELD

OPTION B

355
MULTI-BIT FIELD

ONE BIT PER GROUP OF MASTER
DEVICES NOT BEING
PRECISELY TRACKED

APPARATUS AND METHOD FOR MANAGING SNOOP OPERATIONS

BACKGROUND

The present technique relates to an apparatus and method for managing snoop operations.

A system may include a plurality of master devices that can perform data access operations in order to read data from, and write data to, memory. Those master devices may be provided with local caching structures to enable them to maintain copies of a subset of the data, and as a result it is often necessary to provide a coherency mechanism in order to ensure that each master device is able to access the most up-to-date version of the data being maintained within the system.

For instance, when one master device issues an access request specifying a target address, it is possible that one or more of the other master devices may have cached copies of the data from the target address, and hence to maintain coherency a snoop unit can be used to send snoop transactions to the other master devices to check the status of the cached copies at those other devices, for example to identify the most up-to-date data value for the target address. Whilst in one known arrangement, the snoop unit can be arranged to issue snoop transactions (also referred to herein as snoop requests) to all of the master devices that are capable of storing cached copies of the data, in an alternative arrangement it is known for the snoop unit to use a snoop filter in order to seek to reduce the number of snoop transactions required. In particular, a snoop filter may record which master devices have cached data for various addresses. By only sending snoop transactions to the master devices recorded in the snoop filter for a given address, the number of snoop transactions can be reduced.

However, as systems increase in complexity, the number of master devices within such systems are increasing, and this can have a significant impact on the size of the snoop filter storage required within the snoop unit to track which master devices have cached data for the various addresses being monitored within the snoop unit. As the size of the snoop filter storage increases, this not only increases the cost of providing the snoop filter storage, but also can have knock-on adverse effects, such as increasing the power consumption required by the snoop unit, and increasing the time taken to access the snoop filter storage in order to obtain the information used to control the snoop requests issued by the snoop unit.

SUMMARY

In one example arrangement, there is provided an apparatus comprising: an interface to receive access requests from a plurality N of master devices that have associated cache storage, each access request specifying a memory address within memory associated with the apparatus; snoop filter storage having a plurality of snoop filter entries, each snoop filter entry being arranged to identify a memory portion, and to maintain snoop control information indicative of the master devices that have accessed that memory portion; and snoop control circuitry that is arranged, when an access request received at the interface specifies a memory address that is within the memory portion associated with a snoop filter entry, to employ the snoop control information in that snoop filter entry to determine which master devices to subject to a snoop operation; the snoop control circuitry being arranged to maintain master indication data used to identify a first subset of the plurality of master devices whose accesses to the memory are to be precisely tracked within the snoop filter storage, the first subset comprising up to M master devices, where M is less than N; each snoop filter entry having a precise tracking field and an imprecise tracking field, and being arranged, when multiple master devices have accessed the memory portion associated with that snoop filter entry, to precisely identify within the precise tracking field each master device of those multiple master devices that is within the first subset, and to set a generic indication in the imprecise tracking field to identify when the multiple master devices include at least one master device absent from the first subset.

In another example arrangement, there is provided a method of operating an apparatus, comprising: receiving at an interface access requests from a plurality N of master devices that have associated cache storage, each access request specifying a memory address within memory associated with the apparatus; maintaining a plurality of snoop filter entries within snoop filter storage, each snoop filter entry identifying a memory portion, and providing snoop control information indicative of the master devices that have accessed that memory portion; when an access request received at the interface specifies a memory address that is within the memory portion associated with a snoop filter entry, employing the snoop control information in that snoop filter entry to determine which master devices to subject to a snoop operation; maintaining master indication data used to identify a first subset of the plurality of master devices whose accesses to the memory are to be precisely tracked within the snoop filter storage, the first subset comprising up to M master devices, where M is less than N; providing each snoop filter entry with a precise tracking field and an imprecise tracking field; and when multiple master devices have accessed the memory portion associated with that snoop filter entry, precisely identifying within the precise tracking field each master device of those multiple master devices that is within the first subset, and setting a generic indication in the imprecise tracking field to identify when the multiple master devices include at least one master device absent from the first subset.

In a yet further example arrangement, there is provided an apparatus comprising: interface means for receiving access requests from a plurality N of master devices that have associated cache storage, each access request specifying a memory address within memory associated with the apparatus; snoop filter storage means for providing a plurality of snoop filter entries, each snoop filter entry being arranged to identify a memory portion, and to maintain snoop control information indicative of the master devices that have accessed that memory portion; and snoop control means for employing, when an access request received at the interface means specifies a memory address that is within the memory portion associated with a snoop filter entry, the snoop control information in that snoop filter entry to determine which master devices to subject to a snoop operation; the snoop control means for maintaining master indication data used to identify a first subset of the plurality of master devices whose accesses to the memory are to be precisely tracked within the snoop filter storage means, the first subset comprising up to M master devices, where M is less than N; each snoop filter entry having a precise tracking field and an imprecise tracking field, and being arranged, when multiple master devices have accessed the memory portion associated with that snoop filter entry, to precisely identify within the precise tracking field each master device of those multiple master devices that is within the first subset, and to set a generic indication in the imprecise tracking field to identify when the multiple master devices include at least one master device absent from the first subset.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
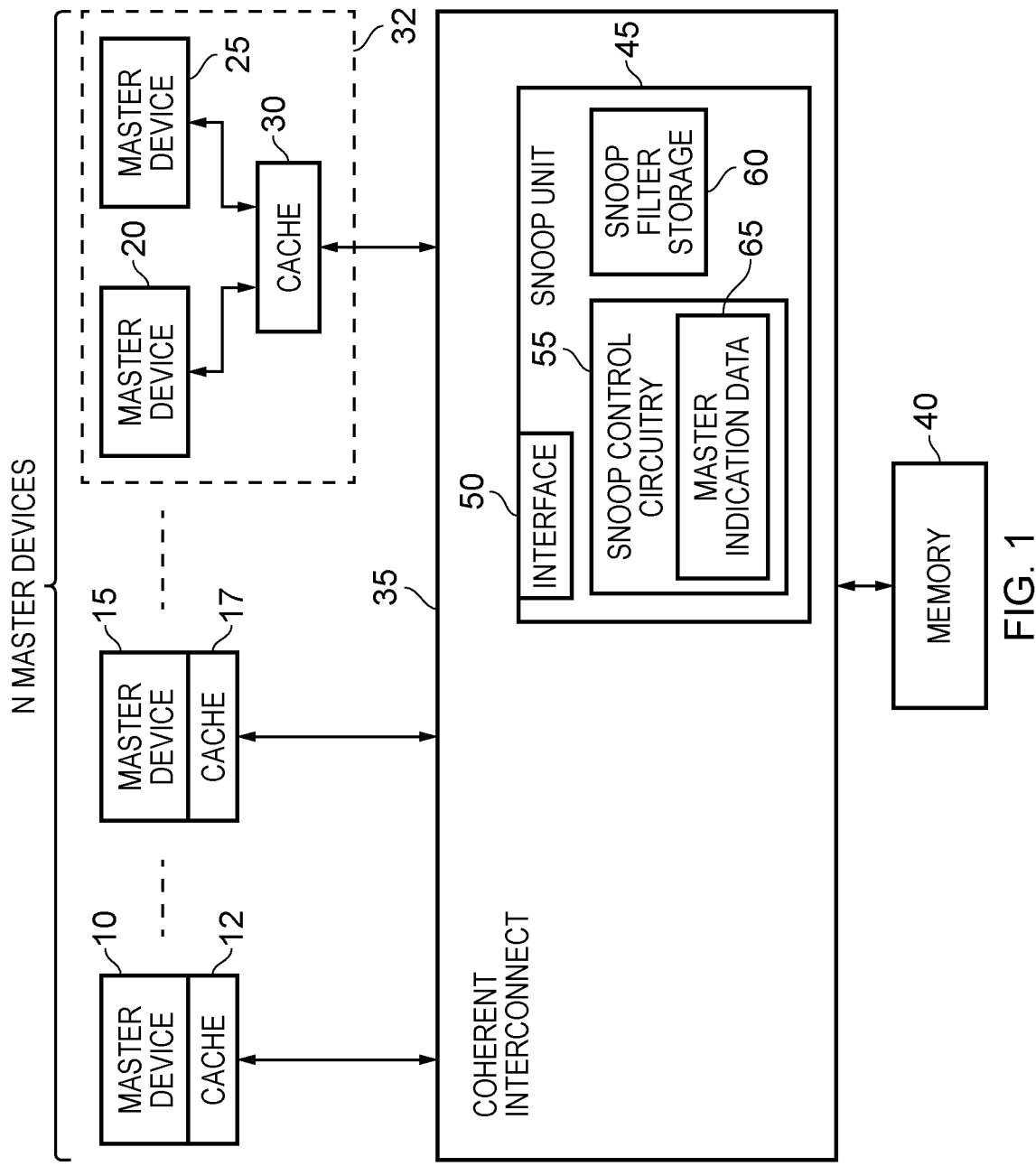
FIG. 1 is a block diagram of a system in accordance with one example arrangement.

In one example, an apparatus is provided that has an interface for receiving access requests from a plurality N of master devices that have associated cache storage, each access request specifying a memory address within memory associated with the apparatus. The apparatus can take a variety of forms, but in one example arrangement is a snoop unit that may for instance be provided in association with interconnect circuitry of a system used to interconnect the plurality of master devices.

The apparatus further has snoop filter storage providing a plurality of snoop filter entries, where each snoop filter entry is used to identify a memory portion, and to maintain snoop control information indicative of the master devices that have accessed that memory portion. The granularity of the memory portion can be varied dependent on implementation, but in one example arrangement the memory portion associated with each snoop filter entry corresponds to a cache line sized block of memory.

The apparatus further has snoop control circuitry that is arranged, when an access request received at the interface specifies a memory address that is within the memory portion associated with a snoop filter entry, to employ the snoop control information in that snoop filter entry to determine which master devices to subject to a snoop operation. The snoop operation can then be invoked on a particular master device by sending a snoop transaction (also referred to herein as a snoop request) to that master device.

However, as mentioned earlier, the snoop filter storage entries may need to be quite large, in order to uniquely identify which of any of the N master devices have accessed the associated memory portion. However, in accordance with the techniques described herein, the snoop control circuitry is arranged to maintain master indication data that is used to identify a first subset of the plurality of master devices whose accesses to the memory are to precisely tracked within the snoop filter storage, where that first subset comprises up to M master devices, where M is less than N. Each snoop filter entry then includes a precise tracking field and an imprecise tracking field. When multiple master devices have accessed the memory portion associated with a snoop filter entry, then that snoop filter entry is used to precisely identify within the precise tracking field each master device amongst those multiple master devices that is within the first subset. However, rather than seeking to precisely identify any master devices outside of that first subset, instead the snoop filter entry is arranged so that a generic indication is set in the imprecise tracking field to identify a situation where the multiple master devices that have accessed the memory portion include at least one master device not in the first subset.

It has been found that this can enable a significant reduction in the size requirements of the snoop filter storage, whilst still allowing a degree of precise tracking to take place. In particular, it has been realised that in many instances it will be expected that not all of the master devices are likely to be performing accesses to at least certain parts of the memory, and accordingly the master indication data can be used to identify the subset of the master devices that are more likely to be making accesses, enabling accesses by that subset of master devices to still be precisely tracked. However, rather than precisely tracking accesses by the remaining master devices, any accesses by those master devices can be imprecisely tracked.

By such an approach, it has been found that significant use of targeted snoop requests directed to particular master devices can be made, reducing the need for untargeted, broadcast, snoop requests that can cause unnecessary snoop operations to be performed, whilst preventing an undesirable increase in the size of the snoop filter storage required.

In one example arrangement, the snoop control circuitry is arranged, when employing the snoop control information in a snoop filter entry to determine which master devices to subject to a snoop operation, to issue a targeted snoop request to each master device precisely identified in the precise tracking field, and to issue a broadcast snoop request in order to request performance of the snoop operation for master devices absent from the first subset when the generic indication is set in the imprecise tracking field.

Hence, by such an approach, it can still be ensured that any master devices that may hold a copy of the required data will be subjected to a snoop operation, but the extent to which broadcast snoop requests are required can be significantly reduced, due to the ability to still precisely track accesses by the particular master devices within the identified first subset. In situations where knowledge of the operation of the system can be used to make a sensible determination as to the master devices to identify within the first subset, such an approach can enable both the overall size of the snoop filter storage to be constrained, avoiding the need for each snoop filter entry to be able to uniquely identify all master devices that have accessed the associated memory portion, whilst reducing the likelihood of unnecessary snoop operations being required. In particular, it will be appreciated that a broadcast snoop request is only required if a master device not in the first subset accesses the memory portion.

The precise tracking field can take a variety of forms, but in one implementation is an M-bit field, each bit being associated with one master device in the first subset as identified by the master indication data. Hence, each bit within the precise tracking field can be set or cleared dependent on whether an associated master device has or has not accessed the memory portion, and the manner in which those bits are then interpreted is controlled by the master indication data. In particular, the master indication data can be used to identify how each bit maps to a particular master device.

The generic indication that is set within the imprecise tracking field can take a variety of forms, but in one example arrangement is the same irrespective of which master device outside of the first subset has accessed the memory portion associated with the snoop filter entry. Hence, in such an implementation, no attempt is made to distinguish between any of the master devices not within the first subset. In one particular example arrangement, the imprecise tracking field is a single bit field which is set to a first value to provide the generic indication and is cleared to a second value to indicate that the multiple master devices only include master devices within the first subset. In such an arrangement, it will be appreciated that when the generic indication is set within a snoop filter entry that is being used by the snoop control circuitry to determine which master devices to subject to a snoop operation, a broadcast snoop request will be issued to request performance of the snoop operation for all of the master devices outside of the first subset.

In an alternative arrangement, by increasing the size of the imprecise tracking field, particular groups of master devices that are not within the first subset can be identified. For example, the generic indication may identify a group of master devices absent from the first subset, and is set when any master device in that group is amongst the multiple master devices that have accessed the memory portion associated with the snoop filter entry. Hence, when the generic indication is set in association with a particular group of master devices in a snoop filter entry that is used by the snoop control circuitry to determine which master devices to subject to a snoop operation, then the broadcast snoop request can be directed to the master devices within that group, rather than needing to direct the broadcast snoop request to all of the master devices outside of the first subset.

In one such arrangement, the imprecise tracking field is a multi-bit field allowing multiple different groups of master devices to be identified by the generic indication. Such an approach can hence further reduce the likelihood of unnecessary snoop operations being performed, whilst still allowing precise tracking to be maintained in respect of all of the master devices within the first subset.

In one example arrangement, each snoop filter entry has a state field. When, for a snoop filter entry, access by only a single master device is made to the memory portion associated with that snoop filter entry, the state field may be set to identify that the memory portion has been uniquely accessed by a single master device, and that single master device is precisely identified within the precise tracking field. Hence, if only one master device has accessed the memory portion for the snoop filter entry, the state of the snoop filter entry can be marked to indicate this fact, and in that instance the precise tracking field can be used in a way that allows that single master device to be precisely identified.

In this situation, the way in which the bits within the precise tracking field are used is different to the situation where multiple master devices have accessed the memory portion associated with a snoop filter entry. In particular, since only a single master device needs to be identified, the M bits within the precise tracking field can be used collectively to identify uniquely any single one of the N master devices. For example, in one example arrangement, the single master device is precisely identified within the precise tracking field by incorporating within the precise tracking field a multi-bit identifier that uniquely distinguishes the single master device from any of the other N−1 master devices in the plurality of master devices. For instance, an address indication can be used for this purpose, where the address indication differs for each of the N master devices, and hence the address indication uniquely identifies one of those N master devices.

In one example implementation, when the state field is set to identify that the memory portion has been uniquely accessed by a single master device, the imprecise tracking field is unused. In particular, as will be apparent from the earlier discussion, when the state field is set to identify that only a single master device has accessed the memory portion, then that single master device is explicitly identified, and hence there is no imprecise tracking being performed.

In one example arrangement, once a subsequent access is made to the memory portion associated with the snoop filter entry, the state field may be set to identify that shared access to the memory portion by multiple master devices has occurred. Hence, once it is determined that there are now multiple master devices that are accessing the memory portion, the state field is set to identify that access to the memory portion is shared.

At this point, the way in which the precise tracking field is used is changed. In particular when the state field is set to identify that shared access to the memory portion by multiple master devices has occurred, each bit within the precise tracking field is associated with one master device in the first subset as identified by the master indication data, thereby enabling any of the M master devices within the first subset to be precisely identified within the precise tracking field. Hence, at this point it can be determined whether the original master device that was uniquely identified whilst the snoop filter entry had its unique state set is within the first subset or not, and if it is within the first subset then it can be uniquely identified by setting the appropriate bit within the M-bit field. Alternatively, if that master device is not within the first subset, then the imprecise tracking field will have the generic indication set. Similarly, for the master device that has now additionally accessed the memory portion, the same analysis can be performed, and the precise tracking field or imprecise tracking field updated accordingly.

In one example arrangement, the memory associated with the apparatus can be considered as comprising multiple memory regions. Whilst the master indication data can be specified for the entire memory, in an alternative arrangement the master indication data maintained by the snoop control circuitry may be configurable for each memory region. This can provide further performance improvements. In particular, it may be that different memory regions are accessed by different processes performed within the system, and for any one of those processes it may be possible to determine the master devices that are most likely to access the memory region. Hence, by enabling the master indication data to be configured for each memory region, the identification of the master devices within the first subset can be varied on a memory region by memory region basis. By such an approach, this can further reduce the likelihood of unnecessary snoop operations being performed.

Whilst the master indication data may be fixed, in one example arrangement it can be reconfigured dynamically during use of the system. For example, the snoop control circuitry can be arranged to be responsive to a trigger event to reconfigure the master indication data. When reconfiguring the master indication data, it is necessary first to review the snoop filter entries that are associated with memory portions for which the master indication data is to be altered by the reconfiguration. In particular, using the existing content of those snoop filter entries, the master devices that are holding copies of data within the memory portion can be identified, and invalidation operations can be issued to those master devices in order to flush the contents of the relevant cache lines within their caches. During this process, if any cache is holding a more up-to-date version of the data than is stored in memory, then that data can be written out to memory. At this point the relevant snoop filter entries themselves can then be invalidated, whereafter the master indication data can be altered. This ensures that there is no incorrect assessment of the contents of precise tracking fields due to a change in the master indication data, by ensuring that any affected snoop filter entries are flushed prior to the master indication data being updated.

Particular examples will now be described with reference to the Figures.

FIG. 1 is a block diagram of a system including a snoop unit that is arranged to incorporate the techniques described herein. A plurality of master devices 10, 15, 20, 25 are coupled to a coherent interconnect 35 via which they can access a plurality of slave devices (not explicitly shown in the figure), where one of those slave devices may be a memory controller for controlling access to memory 40. Each of the master devices 10, 15, 20, 25 has associated cache 12, 17, 30 for storing cached versions of data from the memory 40. Whilst in FIG. 1 each of the master devices is assumed to have associated local cache structures, this is not essential, and one or more of the master devices may not have a local cache structure. However, for the purposes of the discussion of the operation of the snoop unit, and the performance of snoop operations, the master devices of interest are the ones that have access to a local cache structure.

Whilst the various master devices connected to the interconnect 35 may be individual processing units, such as a central processing unit (CPU) or a graphics processing unit (GPU), it is possible that one or more of the master devices may effectively form a subsystem, consisting of multiple individual processing units which may for example have access to a shared cache structure, as illustrated by way of example with reference to the subsystem 32 comprising the master devices 20, 25 that share a local cache structure 30.

Whenever the system includes master devices that have an associated local cache structure, it will typically be necessary for the interconnect to implement a coherency protocol to ensure that the various master devices coupled to the interconnect will always see the most up-to-date version of any particular data item. To assist in the implementing the coherency protocol, the coherent interconnect 35 includes a snoop unit 45 which aims to keep track, for each of a number of different memory portions, of which master devices have accessed addresses within those memory portions, thus identifying which master devices may hold cached copies of data relating to those memory portions. When it is determined that a coherency action is required, the snoop unit 45 is used to determine which caches associated with the master devices should be subjected to a snoop operation in order to determine information about the data cached within those caches for a particular memory address. In particular, a snoop request can be issued from the snoop unit to such a cache specifying a snoop address, causing a lookup to be performed within the cache, and information returned to the snoop unit indicative of the result of that lookup. There will typically be local coherency control circuitry in association with each of the caches that can take an appropriate action in response to the snoop request. In particular, if a hit is detected, then dependent on the coherency protocol being used, it may be appropriate for the local cache to invalidate the cache line containing a copy of the data and/or to return its copy of the data to the snoop unit as part of a snoop response. Alternatively, it may return the data to the snoop unit without invalidating its copy. Further, in other examples, it may merely need to invalidate the cache line containing a copy the data, without needing to return its copy of the data to the snoop unit.

Whenever an access request is issued by one of the master devices seeking to access data at a memory address specified by the access request, and a hit is not detected in any local cache structure of that master device, then that access request will be propagated on to the interface 50 of the snoop unit 45. It should be noted that, when employing certain cache coherency protocols, that access request may still be propagated on to the interface 50 even if there is a hit in a local cache, depending on the type of access that the master device is seeking to perform. For example, if the originating master device (i.e. the master device issuing the access request) is seeking to perform a write access, and a hit is detected in its local cache, it may be appropriate to determine whether any of the other master devices also have a local cached copy, by reference to the snoop unit 50, since those copies will become out of data once the write access has been performed to the originating master device's local cache, and hence in some cache coherency protocols it may be considered appropriate to invalidate any other master device's local copies at the time the write access is being performed to the originating master device's local cache.

Whenever an access request is received by the interface 50, then snoop control circuitry 55 within the snoop unit 45 is used to determine whether any snoop operations are required, and if so to issue snoop requests to the relevant master devices to cause snoop operations to be performed, during which their local cache structures will be accessed as discussed earlier and any appropriate coherency action taken, resulting in the provision of a snoop response back to the snoop unit.

Rather than merely broadcasting a snoop request to every master device that has an associated local cache structure, the snoop unit 45 has snoop filter storage 60 that provides a plurality of snoop filter entries, where each snoop filter entry is arranged to identify a memory portion, and to maintain snoop control information indicative of the master devices that have accessed that memory portion. The memory portion identified in each snoop filter entry can take a variety of forms. For example, the memory portion may correspond to a unique address in memory, or can specify an address range. In one particular example, each memory portion corresponds to a range of memory addresses of a size that matches the size of a cache line within one of the caches.

When an access request is received at the interface 50, the snoop control circuitry 55 can perform a lookup operation within the snoop filter storage 60 using the memory address specified by the access request in order to determine whether there is a hit in any of the snoop filter entries, i.e. whether the memory address is an address within the memory portion associated with a particular snoop filter entry. If so, then the snoop control information can be retrieved from that snoop filter entry in order to determine which of the master devices are to be subjected to a snoop operation. The various entries in the snoop filter storage are updated as each access request is performed by the master devices, so as to seek to maintain information about the master devices that have accessed particular memory portions being tracked within the snoop filter storage. By such an approach, this can significantly reduce the number of snoop operations that need to be performed, relative to an approach which merely speculatively broadcasts snoop requests to all of the master devices.

However, as systems increase in complexity, the number of master devices provided within the system is becoming relatively large, and this has an adverse effect on the size of the snoop filter storage required to track accesses by the individual master devices. In particular, as the size requirements of the snoop filter storage increase, then this increases the area cost associated with providing the snoop unit, and also has other consequential effects, such as increasing the power consumption required by the snoop unit, and increasing the time taken to access the snoop filter storage in order to obtain the information used to control the snoop requests issued by the snoop unit 45.

In accordance with the techniques described herein, a mechanism is provided that can reduce the size requirements of the snoop filter storage, whilst still enabling targeted snoop requests to be issued by the snoop unit in many situations.

Figure 2:
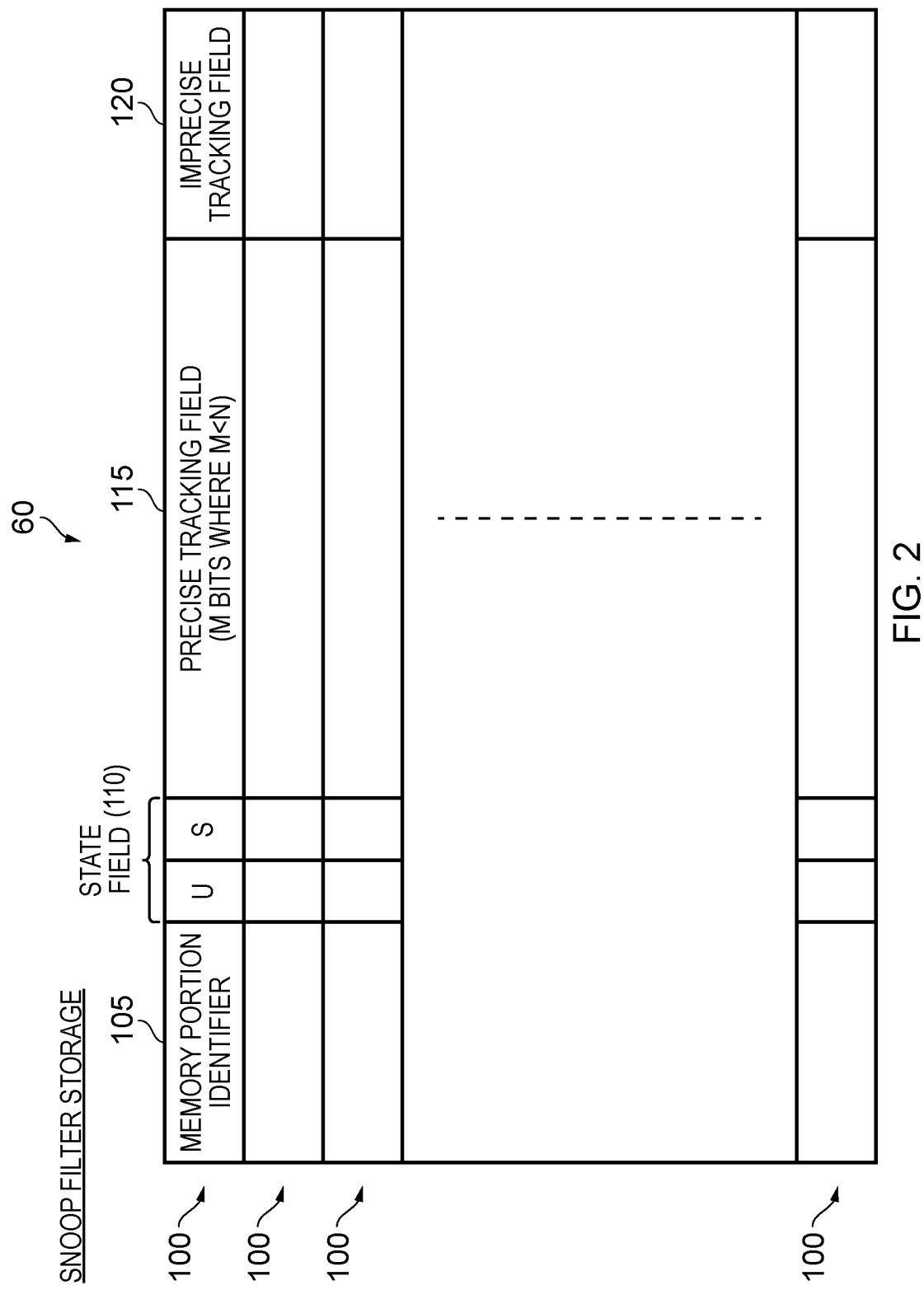
FIG. 2 illustrates in more detail fields that may be provided within the snoop filter entries of the snoop filter storage of FIG. 1 in one example arrangement.

In particular, as shown in FIG. 2, each snoop filter entry 100 within the snoop filter storage 60 has a precise tracking field 115 consisting of M bits, and an imprecise tracking field 120. In the examples discussed herein, it is assumed that there are N master devices within the system, and that M is less than N. Hence, the precise tracking field cannot be used to precisely track accesses to the associated memory portion by all of the N master devices within the system. Instead, as shown in FIG. 1, the snoop control circuitry 55 maintains master indication data 65 which can be used to identify a first subset of the plurality of master devices whose accesses to the memory are to be precisely tracked within the precise tracking field 115 of the snoop filter entries. The first subset of master devices that can be identified by the master indication data comprises up to M master devices.

The master indication data can take a variety of forms. In the implementations described herein, it directly identifies each of the master devices that are within the first subset. However, alternatively, it will be appreciated that the master indication data could be used to identify the master devices that are not within the first subset, with the identity of the master devices within the first subset then being determinable based on knowledge of the master devices within the system.

As shown in FIG. 2, each snoop filter entry also includes a memory portion identifier 105 that is used to provide an address portion sufficient to identify the memory portion to which the snoop filter entry relates. Further, a state field 110 is provided that can identify a state associated with the snoop filter entry. As will be discussed in more detail herein, there are two states of interest to the technique described herein, namely a unique (U) state and a shared (S) state. When the unique state is set, this means that only a single master device is accessing an address within the memory portion associated with the snoop filter entry, and the bits within the precise tracking field are used to uniquely identify that master device. For example, a plurality of the bits within the precise tracking field can be used to capture an address indication that uniquely identifies one of the master devices amongst the N master devices. Purely by way of specific example, if there were 64 master devices within the system, it will be appreciated that six bits can be used to specify an address for each of the master devices in a unique manner, and accordingly six bits with the precise tracking field can be used to capture such an address. Provided M is greater than or equal to the number of address bits required to uniquely identify any particular master device, it will be appreciated that the precise tracking field is large enough to enable any individual one of the N master devices to be identified within a snoop filter entry who has its state field 110 set to identify the unique state. The imprecise tracking field is not used whilst the snoop filter entry is in the unique state.

In contrast, when multiple master devices have accessed addresses within the memory portion associated with a snoop filter entry, then the shared state is identified within the state field 110, and in this instance the various bits within the precise tracking field are used in a different manner to that described above when the snoop filter entry is in the unique state. In particular, when in the shared state, each individual bit within the precise tracking field is associated with one master device, with the mapping between the individual bits and the master devices being determined with reference to the master indication data 65. Whenever one of the master devices within the first subset that are being precisely tracked accesses an address within the memory portion, then its corresponding bit within the precise tracking field can be set to identify that fact. Further, whenever any master device outside of the first subset accesses an address within the memory portion, then this can be indicated by setting a value within the imprecise tracking field 120.

In one example arrangement, the imprecise tracking field need merely be a single bit value, where a first value, (e.g. a logic zero value) indicates that no access has been made by any master device that is outside of the first subset, whereas an alternative logic value (for example a logic one value) indicates that an access to that memory portion has been made by at least one master device not being precisely tracked. As will be discussed in more detail later, whilst in one implementation the imprecise tracking field 120 may merely be a single bit value, it can in an alternative implementation take the form of a multi-bit value, with each bit being associated with a particular group of master devices outside of the first subset.

Figure 3:
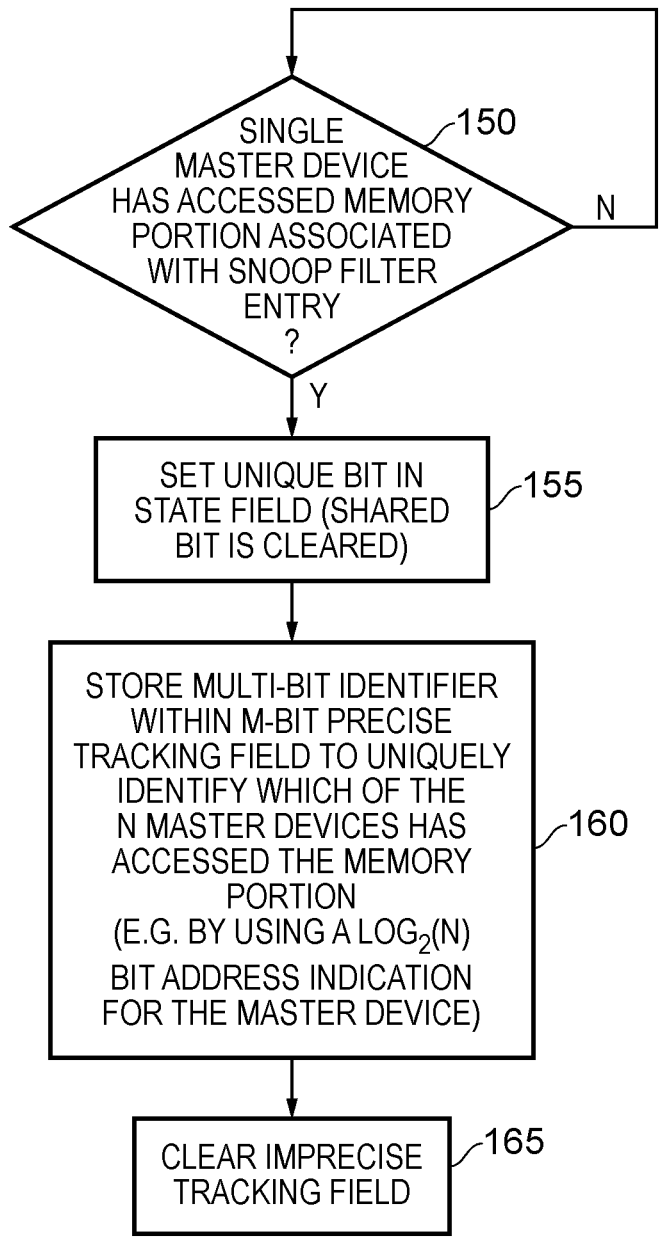
FIG. 3 is a flow diagram illustrating how the fields of a snoop filter entry are used when only a single master device has accessed the memory portion associated with that snoop filter entry, in accordance with one example arrangement.

FIG. 3 is a flow diagram illustrating the steps performed in order to update a snoop filter entry when it is determined that only a single master device has accessed the memory portion associated with that snoop filter entry. When such a situation is detected at step 150, then at step 155 the unique bit is set within the state field 110, the shared bit being cleared. In one implementation, as shown in FIG. 2, separate state bits are provided within the state field for the unique state and the shared state. However, in an alternative implementation it will be appreciated that it may be possible to provide a single bit field for this purpose, with one value indicating the unique state and another value indicating the shared state.

In addition to setting the unique bit at step 155, at step 160 a multi-bit identifier is stored within the M-bit precise tracking field to uniquely identify which of the N master devices has accessed the memory portion. This can for example be done by using a log 2(N)-bit address indication for that individual master device within the precise tracking field. At step 165, the imprecise tracking field is cleared, since the imprecise tracking field is not used when the snoop filter entry is in the unique state.

There are a number of situations where it will be detected that only a single master device has accessed the memory portion associated with a snoop filter entry. For example, on a first access to a memory portion that does not yet have a corresponding snoop filter entry, then a snoop filter entry can be allocated for tracking accesses to that memory portion, and on that initial allocation the snoop filter entry will be set to the unique state, to identify the single master device that is the first master device to access that memory portion. However, it is also possible subsequently for a snoop filter entry that is in the shared state to return to being in the unique state. For example, when a particular master device issues an access request that seeks to gain ownership of data in a particular cache line in order to enable an update to be made to that data, then the snoop operations performed using the information currently stored in a shared state snoop filter entry that matches the target address will cause all of the other master devices to invalidate their local copies of the data. If one of those caches also held the most up-to-date version of the data, that data would be returned via the snoop unit to the originating master device's cache.

With regard to the snoop requests issued to perform this coherency action, this will depend on whether the matching snoop filter entry is currently in the shared precise state, i.e. with the shared bit set but the imprecise tracking field cleared, or in the shared imprecise state, i.e. with the shared bit set but the imprecise tracking field also set. In the shared precise state, then only targeted snoop requests will need to be issued, these being sent to the particular master devices identified within the precise tracking field. However, in the event of the shared imprecise state, then in addition to any such targeted snoop requests sent to individual master devices identified within the precise tracking field, a broadcast snoop request will also be sent based on the information in the imprecise tracking field 120, to cause a snoop operation to be performed in respect of master devices not being precisely tracked.

As a result of taking the above coherency action, it will be seen that once the snoop operations have been processed, the originating master device will now uniquely hold the copy of the data in its local cache, and accordingly the corresponding snoop filter entry will transition from the shared state to the unique state.

Figure 4:
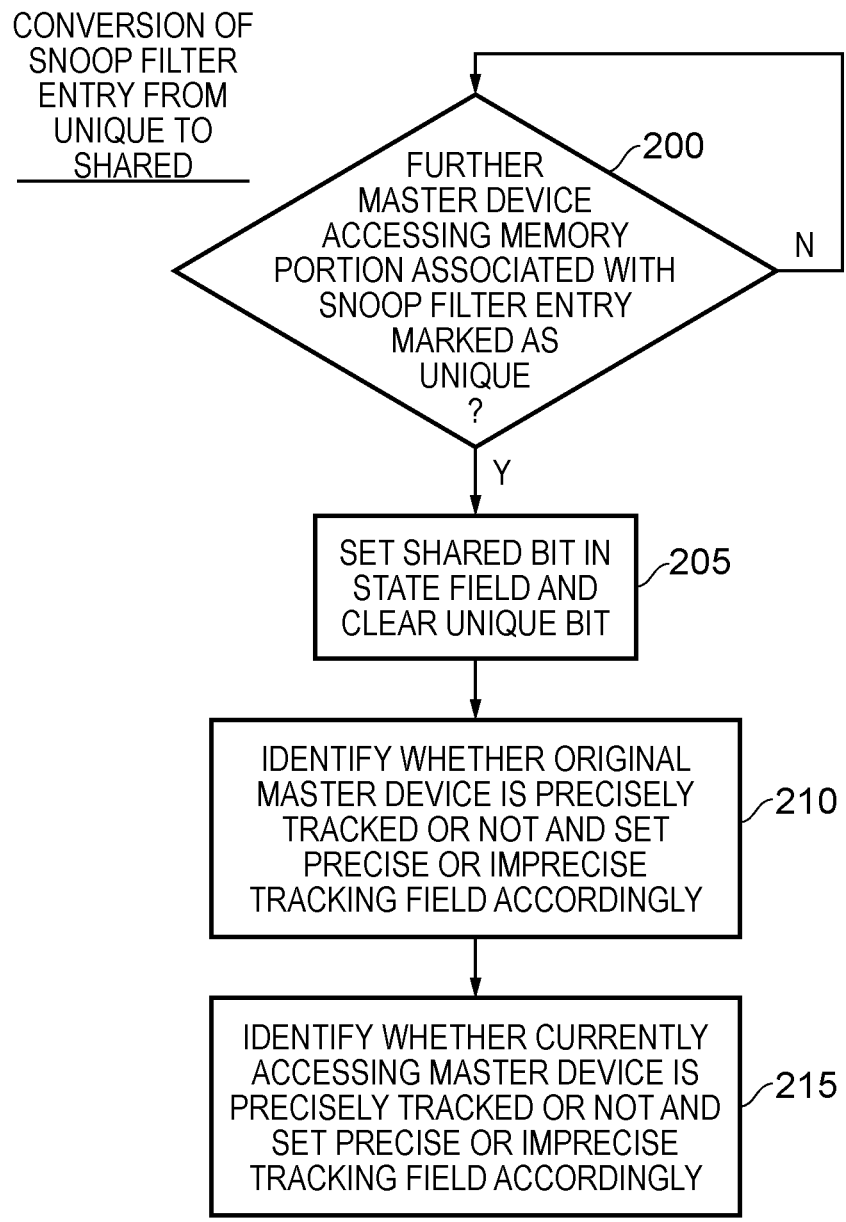
FIG. 4 is flow diagram illustrating how the information maintained within a snoop filter entry is updated when an additional master device accesses the memory portion associated with a snoop filter entry that is marked as unique, in accordance with one example arrangement.

FIG. 4 is a flow diagram illustrating the steps performed in order to convert a snoop filter entry from the unique state to the shared state. At step 200, it is detected whether a further master device is accessing the memory portion associated with a snoop filter entry that is marked as unique. When such a situation is detected, then at step 205 the shared bit is set in the state field 110 and the unique bit is cleared. Further, at step 210, it is identified whether the original master device (i.e. the master device that was identified when the snoop filter entry was in the unique state) is a precisely tracked master device or not, and based on that determination an update is then made to either the precise tracking field 115 or the imprecise tracking field 120 accordingly. In particular, if the original master device is within the first subset, then at this point the previous content of the precise tracking field is cleared, and a specific bit within the M-bit precise tracking field can then be set to identify access by that original master device. Conversely, if that original master device is outside of the first subset, then the previous content of the precise tracking field is cleared so that none of the bits are set, and instead the imprecise tracking field 120 is set. In addition, at step 215, it is identified whether the currently accessing master device (i.e. the master device that is causing the state transition from the unique state to the shared state) is precisely tracked or not, and the precise or imprecise tracking fields are then set accordingly, as per the process discussed above for the original master device.

Hence, it will be appreciated that, dependent on whether either the original master device or the currently accessing master device is being precisely tracked or not, the transition that takes place when implementing the steps of FIG. 4 may be either a transition from the unique state to the shared precise state or from the unique state to the shared imprecise state.

In addition, when in due course any other master devices access the memory portion associated with the snoop filter entry that is now marked as shared, then step 215 can be repeated for the new accessing master device, in order to determine whether to set the precise or the imprecise tracking fields, assuming that new master device is not seeking to make an access that requires it to uniquely hold the data in its cache. In that latter event, as discussed earlier, steps will be taken to transition the state of the snoop filter entry back to the unique state.

Figure 5:
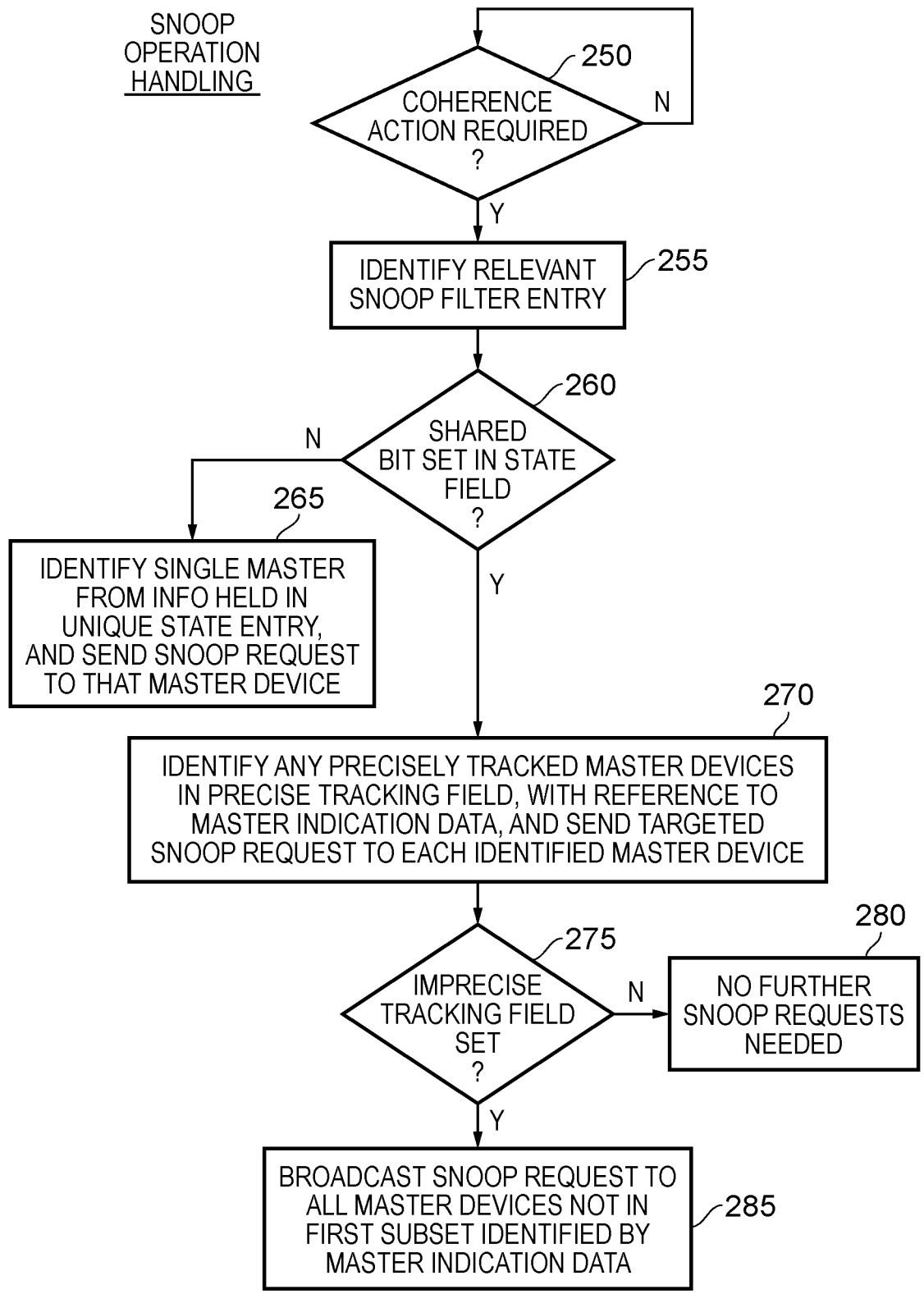
FIG. 5 is a flow diagram illustrating how the information maintained within the snoop filter entries is used when a coherence action is required, in accordance with one example arrangement.

FIG. 5 is a flow diagram illustrating how the performance of snoop operations is handled when the snoop filter storage is arranged as discussed earlier. At step 250, the snoop control circuitry determines whether a coherence action is required. This can occur for a variety of reasons. Firstly, it will typically be the case that a coherence action is required when a new access request is received at the interface 50, the form of coherence action performed being dependent on the current contents of a snoop filter entry that is determined to be a hit for the memory address specified by the access request, and the type of access being performed. It will also be appreciated from the earlier discussion of FIGS. 3 and 4 that, in addition to performing such a coherency action, there is also likely to be an update made to the current snoop filter entry contents to take account of the new access that is taking places. In some instances, the form of update required may depend on the result of the snoop operations performed using the process of FIG. 5, but in other instances it can be predetermined what the update needs to be, without needing to await the snoop filter responses from performance of the snoop operations. Purely by way of specific example of this latter point, if a master device is performing a read unique access request, where it requires the data value to be returned, but also any cached copies in other master devices to be deleted, then it will be known that once the coherency operations have been performed, the cache line will be uniquely owned, and accordingly the snoop filter storage entry will be updated into the unique state.

However, it will also be appreciated that a coherence action may be required for a number of other reasons. For example, there may be maintenance operations that need to be performed within the snoop filter circuitry, which can result in back invalidation of certain snoop filter entries. In particular, when it is desired to invalidate a snoop filter entry, it will typically be necessary to perform snoop operations in respect of any of the caches that may hold copies of the data, so that that data is flushed back to memory, with those cache lines then being invalidated, thus enabling the snoop filter entry to be invalidated. This can free up space within the snoop filter storage to enable the entry to be allocated to a different memory portion.

When at step 250 it is determined that a coherence action is required, then the relevant snoop filter entry is identified at step 255. For the earlier example where the coherence action is triggered by a new access request, then the relevant snoop filter entry will be the one for which a hit is detected for the address specified by the new access request. For a maintenance type of operation, it will merely be the snoop filter entry that has been identified for invalidation.

At step 260 it is determined whether the shared bit is set in the state field in that snoop filter entry. If not, then in accordance with the example discussed earlier the snoop filter will be in the unique state, and the process proceeds to step 265 where the single master device is identified from the information held in the unique state snoop filter entry, and a snoop request is then sent to that single master device. As discussed earlier, the type of coherency action that needs to be performed in respect of that identified master device's cache will depend on the coherency protocol being used, and the type of activity that has caused the need for the coherence action to be determined.

If at step 260 it is determined that the shared bit is set in the state field, then at step 270 any precisely tracked master devices in the precise tracking field of the snoop filter entry are identified, with reference to the master indication data 65 maintained by the snoop control circuitry 55, and then targeted snoop requests are sent to each identified master device. This process will be discussed in more detail later with reference to FIG. 6.

At step 275, it is determined whether the imprecise tracking field is set. If not, then as indicated by step 280 no further snoop requests are needed. However, if the imprecise tracking field is set, then the process proceeds to step 285 where a snoop request is broadcast to all of the master devices not in the first subset identified by the master indication data. As will be discussed in more detail later with reference to FIG. 7, if in an alternative implementation a multi-bit field is used as the imprecise tracking field, then the broadcast snoop request may be sent to one or more particular groups of master devices not in the first subset, rather than to all master devices not in the first subset.

Whilst in FIG. 5 it is assumed that a snoop filter entry can only have the two states "unique" and "shared", in some implementations one or more additional states may also be supported, and if so the step 260 can be altered to determine which of all of the possible states the snoop filter entry is in, will appropriate actions then being taken if the snoop filter entry is in one of the other states.

Figure 6:
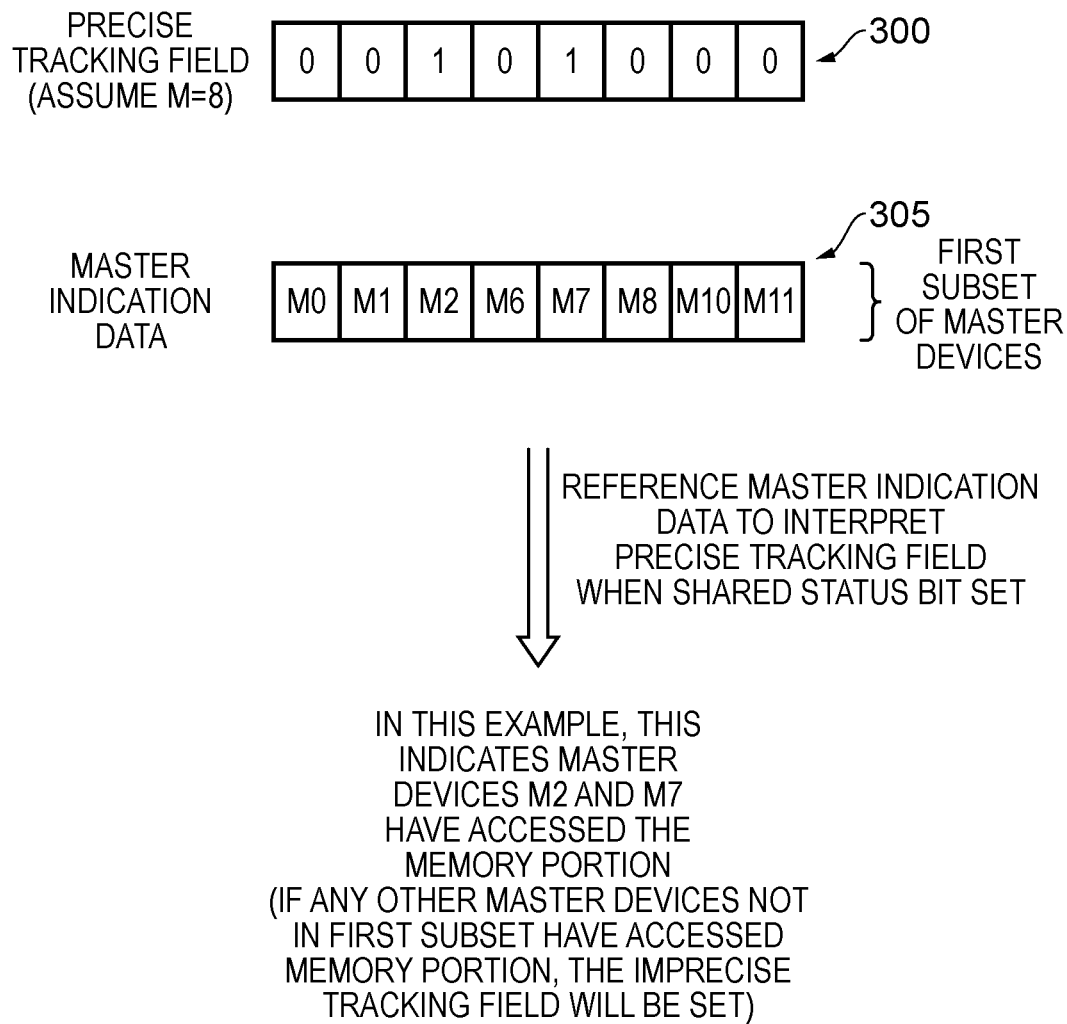
FIG. 6 illustrates how the master indication data maintained by the snoop control circuitry may be used to interpret the information maintained within the precise tracking field of a snoop filter entry whose state field is set to identify the shared state, in accordance with one example arrangement.

FIG. 6 illustrates in more detail how step 270 of FIG. 5 may be performed. In particular, a specific example is shown where the precise tracking field consists of 8 bits, and takes the specific form 300 shown in FIG. 6. Further, it is assumed that the master indication data 65 held by the snoop control circuitry 55 has the specific form shown by the element 305 in FIG. 6. This hence identifies that the first subset of master devices are the master devices M0, M1, M2, M6, M7, M8, M10 and M11. Further, the ordering of that information within the master indication data identifies the correspondence between each master device and the corresponding bit in the M-bit precise tracking field. Accordingly, when the master indication data is referenced during step 270, then in this specific example this will indicate that master devices M2 and M7 have accessed the memory portion, and accordingly targeted snoop requests can be issued to those two master devices.

As is apparent from the earlier discussion of FIG. 5, if any other master devices not in the first subset have accessed the memory portion, then this will be identified by the imprecise tracking field being set, and will result in the broadcast snoop request discussed with reference to step 285 of FIG. 5. However, it has been found that in many situations, by appropriate selection of the master devices to be identified within the master indication data, the need for broadcast snoop requests can be significantly reduced, hence enabling the benefits of reduction in snoop traffic to be achieved, but without the need to size the snoop filter storage so that any particular snoop filter entry can precisely track accesses by all of the master devices.

Figure 7:
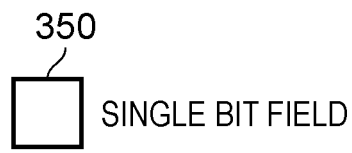
FIG. 7 illustrates two alternative options for provision of the imprecise tracking field of FIG. 2.
Figure 7:
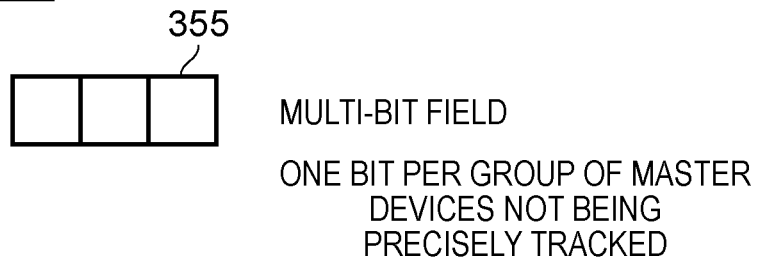

FIG. 7 illustrates two options for the imprecise tracking field. As indicated by option A, a single bit field 350 may be provided, which can either be set or cleared dependent on whether any master device not being precisely tracked has accessed the associated memory portion.

However, as indicated by option B, if desired a multi-bit field 355 can be provided, where each bit is associated with a particular group of master devices that are not being precisely tracked. Information about such group membership can then be maintained by the snoop control circuitry, and that membership could be software configurable if desired. By such an approach, even though no master devices outside of the first subset are being precisely tracked, it can still be the case that any broadcast snoop requests required can be issued to a limited number of master devices outside of the first subset, rather than to all master devices, hence further reducing the snoop traffic in situations where accesses are made by master devices that are not within the first subset being precisely tracked.

The decision as to how to group the master devices that are not being precisely tracked can be varied dependent on implementation. In one specific example, as will be discussed with reference to FIG. 10, it may be that the multiple master devices are spread across multiple chips, and it may be that the master devices in several of those chips are not being precisely tracked by a particular snoop unit, but those master devices can be grouped dependent on which chip they reside in. By such an approach, when broadcast snoop requests are required, they may merely need to be issued to a subset of the chips.

Figure 8:
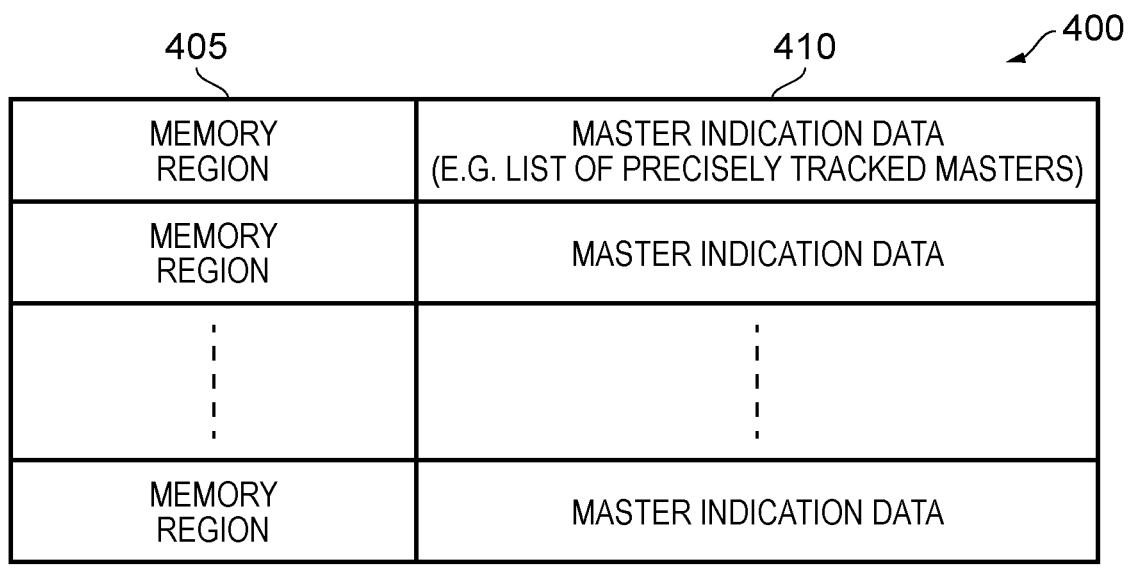
FIG. 8 schematically illustrates how master indication data may be set for different memory regions, in accordance with one example arrangement.

In one implementation, the master indication data 65 maintained by the snoop control circuitry 55 may be the same for any memory portion tracked within the snoop filter storage 60 of the snoop unit 45. However, in an alternative implementation, the memory 40 associated with the snoop unit 45 can be considered to consist of multiple memory regions, and if desired master indication data can be configured independently for each of those memory regions. This is illustrated schematically in FIG. 8, where the master indication data information 400 maintained by the snoop control circuitry 55 comprises multiple sets of master indication data 410, where each set of master indication data is associated with a particular memory region 405. Hence, the identification of the precisely tracked masters can vary dependent on memory region. This can be useful in some situations. For example, it may be known that particular regions of memory are only accessed by particular processes, and those processes may be such that it can be determined which subset of master devices are most likely to access such a memory region. That list of master devices could be different for different memory regions, and accordingly by allowing master indication data to be set separately for different memory regions, this can increase the likelihood that the accesses that do in fact occur occur by master devices that are being precisely tracked, hence reducing situations in which the imprecise tracking field is set, and hence reducing the situations where any broadcast snoop requests are required.

Figure 9:
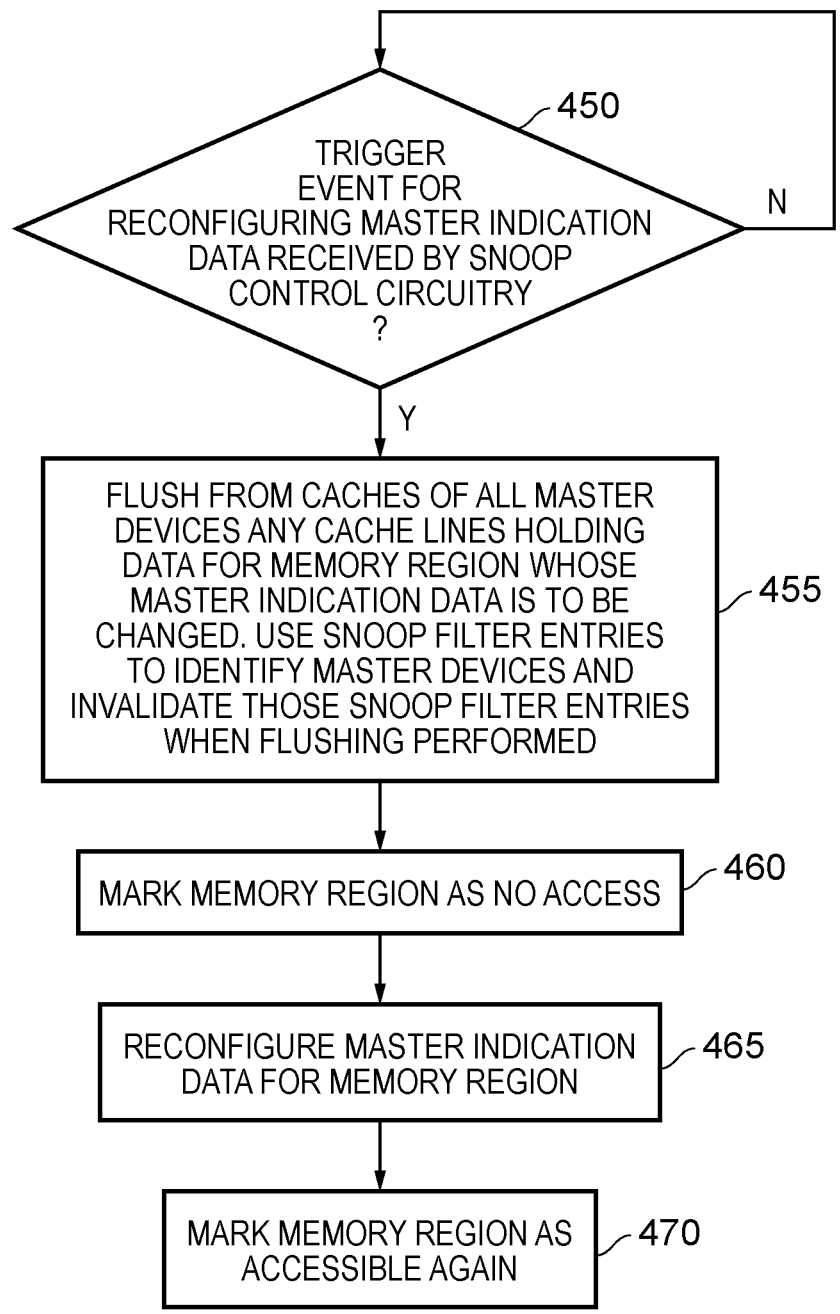
FIG. 9 is a flow diagram illustrating how the master indication data may be reconfigured upon receipt of a trigger event, in accordance with one example arrangement.

In one implementation, the master indication data could be statically set, for example at build time. However, in an alternative implementation, it may be allowed for the master indication data to be reconfigured dynamically at runtime. FIG. 9 schematically illustrates a process that can be performed when seeking to reconfigure master indication data dynamically during runtime. At step 450, a trigger event is awaited indicating that the master indication data is to be reconfigured. The trigger event can take a variety of forms. For instance, it could occur when it is determined that the system is being used to perform a different process, for example due to different code being executed on the system, with the change being significant enough that the expectation as to which master devices will access particular regions of memory alters.

Once a trigger event is received by the snoop control circuitry, then, prior to updating the master indication data, it is appropriate to determine which snoop filter entries would be affected by such an update. For instance, if the update is to be performed with regards to the master indication data for a particular memory region, then any snoop filter entries that are tracking accesses to a memory portion within that memory region will be affected when the master indication data is updated, since once the master indication data is updated it will no longer be possible to interpret the current contents of the precise tracking field (i.e. those that existed prior to the update) for any such any entries that are in the shared state.

Hence, at step 455, any such affected snoop filter entries are identified, and then snoop operations are performed in order to flush from the caches of the master devices any cache lines that hold data for the memory region whose master indication data is to be changed. The snoop filter entries identified as discussed above are used for this purpose, as it will be apparent that once those snoop filter entries have been identified, the snoop control information can be used to identify which master devices to perform such snoop operations in. Once the snoop requests have been issued to those master devices, in order to cause snoop operations to be performed to flush the relevant cache line contents, then the snoop filter entries themselves can be invalidated.

At this point, it is known that there are no active snoop filter entries whose contents would be corrupted by changing the master indication data. In order to ensure that no other intervening accesses occur whilst the master indication data is being reconfigured, then in one implementation, at step 460, the memory region whose master indication data is being updated is marked as not accessible. This can be performed in a variety of ways, for example by changing the access permissions in the relevant page table for that memory region.

At step 465, the master indication data for the memory region can then be reconfigured by updating the information held within the snoop control circuitry 55. Thereafter, at step 470, the memory region can then be marked as accessible again, by performing a further update to the relevant page table, whereafter accesses to that memory region can recommence, and any new snoop filter entries allocated will be populated with information taking into account the updated master indication data.

As an alternative to the performance of steps 460, 470, then in some implementations it may be possible to allow intervening accesses to proceed, but then cause a back invalidation process to be performed to flush the relevant cache line contents and invalidate any snoop filter entry created for such an access.

Figure 10:
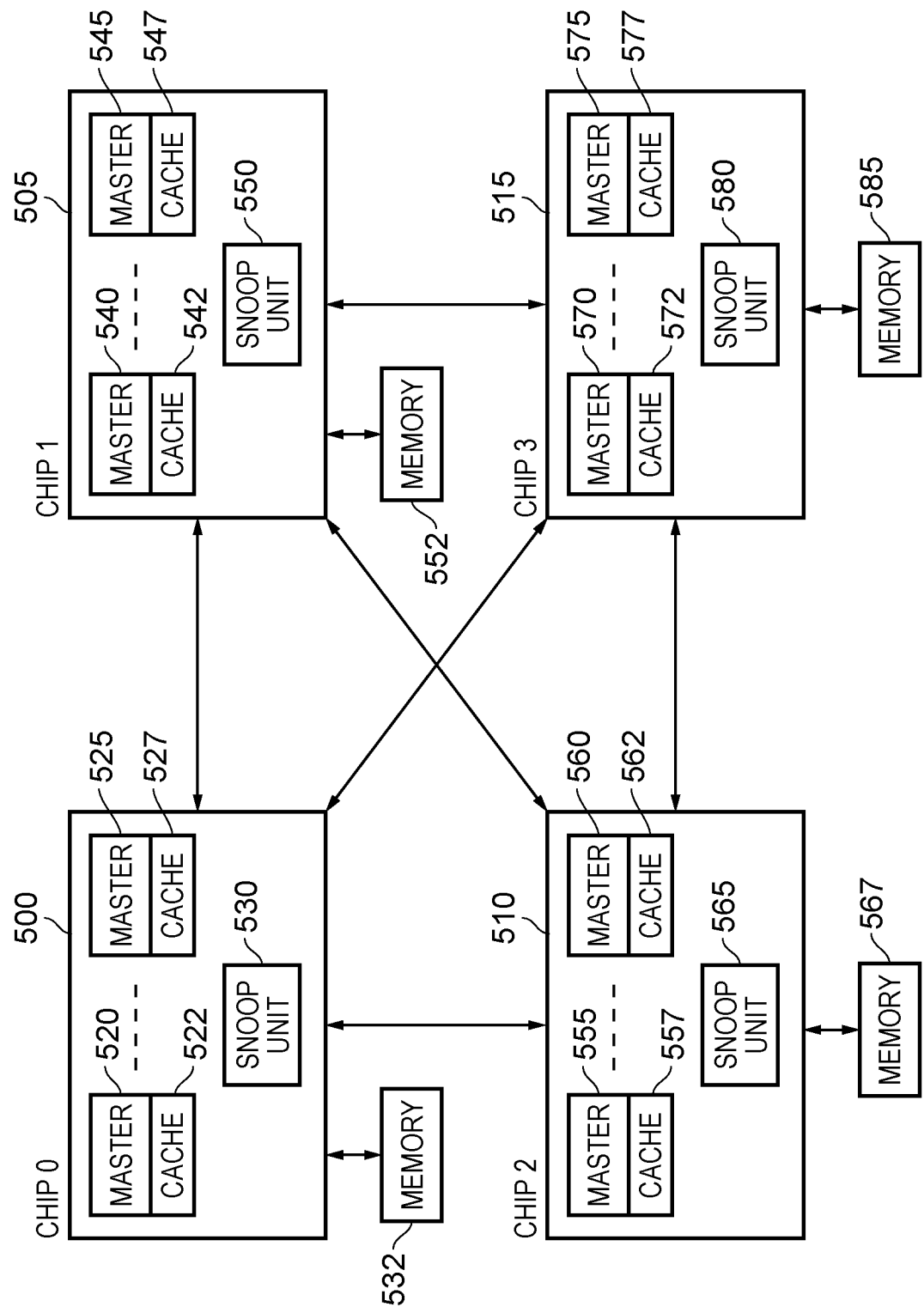
FIG. 10 is a diagram illustrating a system in accordance with an alternative example arrangement.

In the earlier discussed FIG. 1, it was assumed that all of the master devices were connected to a uniform interconnect using a single snoop unit. However, alternative configurations can also be employed, whilst utilising the snoop unit configuration discussed herein. One such example is shown in FIG. 10, where the system is comprised of multiple chips 500, 505, 510, 515, each of which has associated memory 532, 552, 567, 585. The coherent interconnect is formed by the interconnect circuitry within each individual chip (not explicitly shown in the figure), and interconnections between the various chips as shown in FIG. 10.

For each chip's memory, an associated snoop unit 530, 550, 565, 580 may be provided. When any of the master devices within the system issues an access request that requires a coherency operation to be performed, then that access request is forwarded to the snoop unit associated with the memory containing the memory address specified by that access request. Hence, purely by way of example, if the master device 520 within chip 0 500 issues such an access request, and the address specified is an address within the memory 552, then that request would be forwarded to the snoop unit 550 of chip 1 505.

Each of the snoop units 530, 550, 565, 580 may be arranged in the manner discussed earlier, and hence each snoop unit will have an interface, snoop control circuitry maintaining associated master indication data, and a snoop filter storage whose snoop filter entries may be arranged as discussed earlier with reference to FIG. 2, and in particular may include both precise tracking fields and imprecise tracking fields.

Each of the snoop units will hence maintain master indication data relevant to the memory regions within the associated memory for that snoop unit, and it will be appreciated that the master indication data may hence differ between the different snoop units. This provides a great deal of flexibility as to which master devices are precisely tracked by each snoop unit, and in addition which master devices are precisely tracked for particular memory regions within the associated memory of each snoop unit. Based on knowledge of the system, and the operations being performed by that system, it has been found that it is possible to provide master indication data that can ensure that most of the time, all of the master devices that do in fact access particular memory portions are precisely tracked, but without needing to increase the size of the snoop filter entries so that they can precisely track any of the N master devices.

Exactly which master devices are precisely tracked for any particular memory region will vary dependent on implementation. However, purely by way of specific example, a particular snoop unit may set its master indication data so as to precisely track all or a subset of the master devices within its local chip, but to imprecisely track the other master devices within the system. If the multi-bit imprecise field 355 discussed earlier with reference to FIG. 7 is used, then groups of imprecisely tracked master devices can also be defined. Again, how the groups are formed will vary dependent on implementation, but as a very specific example it may in some instances be considered appropriate to group the master devices based on the chip in which they reside. Hence, it could be the case that the snoop unit 550 precisely tracks all of the master devices 540, 545 within its local chip 505, and then groups all of the other master devices as imprecisely tracked masters from particular chips. Hence, when a coherency action is required, it may be able to issue targeted snoop requests to particular master devices within its local chip, and send one or more broadcast snoop requests to one or more of the other chips, dependent on the contents of the imprecise tracking field.

By adopting the techniques described herein, it has been found that most of the benefits of seeking to precisely track accesses by particular master devices can be achieved, thus significantly reducing snoop traffic within the system by enabling targeted snoop requests to be issued most of the time, but without the size and cost issues associated with seeking to increase the size of the snoop filter storage to facilitate such tracking. Such a mechanism can be particularly useful in large systems where there is not active sharing across all of the master devices within the system at any given time, hence enabling the software to group masters for precise and imprecise tracking for periods of time, and if desired enabling the listing of the masters that are being precisely tracked to be changed during runtime. This technique will become ever more valuable as the number of master devices within systems increases.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
an interface to receive access requests from a plurality N of master devices that have associated cache storage, each access request specifying a memory address within memory associated with the apparatus;
snoop filter storage having a plurality of snoop filter entries, each snoop filter entry being arranged to identify a memory portion, and to maintain snoop control information indicative of the master devices that have accessed that memory portion; and
snoop control circuitry that is arranged, when an access request received at the interface specifies a memory address that is within the memory portion associated with a snoop filter entry, to employ the snoop control information in that snoop filter entry to determine which master devices to subject to a snoop operation;
the snoop control circuitry being arranged to maintain master indication data used to identify a first subset of the plurality of master devices whose accesses to the memory are to be precisely tracked within the snoop filter storage, the first subset comprising up to M master devices, where M is less than N;
each snoop filter entry having a precise tracking field and an imprecise tracking field, and being arranged, when multiple master devices have accessed the memory portion associated with that snoop filter entry, to precisely identify within the precise tracking field each master device of those multiple master devices that is within the first subset, and to set a generic indication in the imprecise tracking field to identify when the multiple master devices include at least one master device absent from the first subset.

2. An apparatus as claimed in claim 1, wherein the snoop control circuitry is arranged, when employing the snoop control information in a snoop filter entry to determine which master devices to subject to a snoop operation, to issue a targeted snoop request to each master device precisely identified in the precise tracking field, and to issue a broadcast snoop request in order to request performance of the snoop operation for master devices absent from the first subset when the generic indication is set in the imprecise tracking field.

3. An apparatus as claimed in claim 1, wherein the precise tracking field is an M-bit field, each bit being associated with one master device in the first subset as identified by the master indication data.

4. An apparatus as claimed in claim 1, wherein the generic indication is the same irrespective of which master device outside of the first subset has accessed the memory portion associated with the snoop filter entry.

5. An apparatus as claimed in claim 4, wherein the imprecise tracking field is a single bit field which is set to a first value to provide the generic indication and is cleared to a second value to indicate that the multiple master devices only include master devices within the first subset.

6. An apparatus as claimed in claim 1, wherein the generic indication identifies a group of master devices absent from the first subset, and is set when any master device in that group is amongst the multiple master devices that have accessed the memory portion associated with the snoop filter entry.

7. An apparatus as claimed in claim 6, wherein the imprecise tracking field is a multi-bit field allowing multiple different groups of master devices to be identified by the generic indication.

8. An apparatus as claimed in claim 1, wherein:
each snoop filter entry has a state field;
when, for a snoop filter entry, access by only a single master device is made to the memory portion associated with that snoop filter entry, the state field is set to identify that the memory portion has been uniquely accessed by a single master device, and that single master device is precisely identified within the precise tracking field.

9. An apparatus as claimed in claim 8, wherein the single master device is precisely identified within the precise tracking field by incorporating within the precise tracking field a multi-bit identifier that uniquely distinguishes the single master device from any of the other N−1 master devices in said plurality of master devices.

10. An apparatus as claimed in claim 8, wherein when the state field is set to identify that the memory portion has been uniquely accessed by a single master device, the imprecise tracking field is unused.

11. An apparatus as claimed in claim 8, wherein once a subsequent access is made to the memory portion associated with the snoop filter entry, the state field is set to identify that shared access to the memory portion by multiple master devices has occurred.

12. An apparatus as claimed in claim 11, wherein:

the precise tracking field is an M-bit field;

when the state field is set to identify that shared access to the memory portion by multiple master devices has occurred, each bit within the precise tracking field is associated with one master device in the first subset as identified by the master indication data, thereby enabling any of the M master devices within the first subset to be precisely identified within the precise tracking field.

13. An apparatus as claimed in claim 1, wherein the memory associated with the apparatus comprises multiple memory regions and the master indication data maintained by the snoop control circuitry is configurable for each memory region.

14. An apparatus as claimed in claim 1, wherein the snoop control circuitry is responsive to a trigger event to reconfigure the master indication data.

15. An apparatus as claimed in claim 14, wherein the snoop control circuitry is responsive to the trigger event to flush any snoop filter entries associated with memory portions for which the master indication data is to be altered by the reconfiguration.

16. An apparatus as claimed in claim 1, wherein the memory portion associated with each snoop filter entry has a size corresponding to a size of a cache line within the associated cache storage of at least one master device.

17. A method of operating an apparatus, comprising:

receiving at an interface access requests from a plurality N of master devices that have associated cache storage, each access request specifying a memory address within memory associated with the apparatus;

maintaining a plurality of snoop filter entries within snoop filter storage, each snoop filter entry identifying a memory portion, and providing snoop control information indicative of the master devices that have accessed that memory portion;

when an access request received at the interface specifies a memory address that is within the memory portion associated with a snoop filter entry, employing the snoop control information in that snoop filter entry to determine which master devices to subject to a snoop operation;

maintaining master indication data used to identify a first subset of the plurality of master devices whose accesses to the memory are to be precisely tracked within the snoop filter storage, the first subset comprising up to M master devices, where M is less than N;

providing each snoop filter entry with a precise tracking field and an imprecise tracking field; and when multiple master devices have accessed the memory portion associated with that snoop filter entry, precisely identifying within the precise tracking field each master device of those multiple master devices that is within the first subset, and setting a generic indication in the imprecise tracking field to identify when the multiple master devices include at least one master device absent from the first subset.

18. An apparatus comprising:

interface means for receiving access requests from a plurality N of master devices that have associated cache storage, each access request specifying a memory address within memory associated with the apparatus;

snoop filter storage means for providing a plurality of snoop filter entries, each snoop filter entry being arranged to identify a memory portion, and to maintain snoop control information indicative of the master devices that have accessed that memory portion; and snoop control means for employing, when an access request received at the interface means specifies a memory address that is within the memory portion associated with a snoop filter entry, the snoop control information in that snoop filter entry to determine which master devices to subject to a snoop operation;

the snoop control means for maintaining master indication data used to identify a first subset of the plurality of master devices whose accesses to the memory are to be precisely tracked within the snoop filter storage means, the first subset comprising up to M master devices, where M is less than N;

each snoop filter entry having a precise tracking field and an imprecise tracking field, and being arranged, when multiple master devices have accessed the memory portion associated with that snoop filter entry, to precisely identify within the precise tracking field each master device of those multiple master devices that is within the first subset, and to set a generic indication in the imprecise tracking field to identify when the multiple master devices include at least one master device absent from the first subset.

* * * * *